United States Patent [19]
Roepke et al.

[11] 3,960,009
[45] June 1, 1976

[54] ROCKBOLT SAFETY GAGE

[76] Inventors: Wallace W. Roepke, 640 3rd Ave., Excelsior, Minn. 55331; Patrick J. Cain, 15900 N. Lund Road, Eden Praire, Minn. 55343

[22] Filed: May 2, 1975

[21] Appl. No.: 574,165

[52] U.S. Cl. .................................................. 73/88 F
[51] Int. Cl.² ......................................... G01B 17/04
[58] Field of Search ........................ 73/88 F, 88 E; 116/DIG. 34

[56] References Cited
UNITED STATES PATENTS

| | | | |
|---|---|---|---|
| 2,969,677 | 1/1961 | Lewis | 73/DIG. 1 |
| 3,052,116 | 9/1962 | Critchley | 73/88 E |
| 3,161,174 | 12/1964 | Harrison | 116/DIG. 34 |

FOREIGN PATENTS OR APPLICATIONS

| | | | |
|---|---|---|---|
| 1,069,588 | 7/1954 | France | 73/DIG. 1 |

*Primary Examiner*—James J. Gill
*Assistant Examiner*—Anthony V. Ciarlante
*Attorney, Agent, or Firm*—Thomas Zack; Donald R. Fraser

[57] ABSTRACT

A vibrating wire gage for use with a mine rockbolt. The wire is anchored within the hollow portion of a cylindrical gage body that has an adjustable lower member. Rotation of the adjustable member changes the tension in the wire and as a result its frequency of vibration. Forces acting on the bolt imbedded in the rock cause the gage body to deform as well as its wire since the upper end of the gage body is held to a rockbolt anchored firmly within the earth. By noting variations in the frequency of the wire from an initial setting, the change in the amount of force the rockbolt is under can be determined. A rotatable pick can be inserted through a hole in the lower adjustable member to mechanically pluck the wire. The readout of the vibrations from the plucked wire may be accomplished by a mechanics stethoscope held against the gage or by an electrically operated pickup head which engages the vibrating wire.

8 Claims, 3 Drawing Figures

ROCKBOLT SAFETY GAGE

BACKGROUND OF THE INVENTION

1. Field of the Invention

The invention described in this specification relates to a vibrating wire gage.

2. Description of the Prior Art

Vibrating wire gages per se are known in the prior art. The basic principle behind their operation is essentially the same i.e., to vibrate a taut wire, measure its frequency of vibration and then note variations from this measured frequency. One example of such a gage is found in the U.S. Pat. No. 2,969,677 to A. V. Lewis.

Many of the prior art devices have been especially constructed to operate in a certain type of environment. This is true of our invention which was particularly, but not exclusively, developed to operate in a coal mine. Because of the potentially dangerous explosive condition caused by the methane laden air common to underground coal mine excavations, the use of electronically activated devices should be minimized. Also another major factor to be considered is the cost of manufacturing a gage when it is to be used with rockbolts found by the millions throughout mines. Not only must the gage be permissible for underground mine use but it must be safe and simple in operation. All of these factors were taken into consideration in developing our improved gage as it is mechanically activated, simple in operation, and low in cost. Safety, is emphasized as the in situ rockbolt requires no application of force to readout the frequency of the wire's vibration thus doing away with the associate danger of rock falls from rockbolt tightening or loosening when testing torque for bolt security.

SUMMARY OF THE INVENTION

Our vibrating wire gage has a cylindrical hollow body in which a taut vibrating wire is adjustably anchored between its opposite ends. The upper end of the body is provided with a device to attach the gage to an anchored rockbolt and the lower cylinder end is designed to engage a surface bearing plate. An aperture in the lower end of the unit allows the wire to be mechanically plucked by inserting a pick therein. The frequency of vibration may be readout by a mechanics stethoscope of a electronically operated pickup head.

The principal object of our invention is an improved vibrating wire gage for use with a mine rockbolt.

DESCRIPTION OF THE DRAWINGS

As shown in FIG. 1, the basic components of our invention include the elongated steel cylindrical body 1 with its internal elongated cylindrical cavity 3, the tensioned vibrating wire 5, the upper anchor seat 7, and the lower anchor seat 9. Wire retaining end members 11 and 13 maintain the wire in its taut condition. The lower end of the body consists of a fixed head 15 with a disc shaped upper bolt portion 17. In addition to these basic components, there is an aperture 19 in the lower anchor to allow access to the body's cavity and an internal threaded portion 21 on the upper end of the body where a standard bolt body (not shown) must be inserted.

Figure 1:
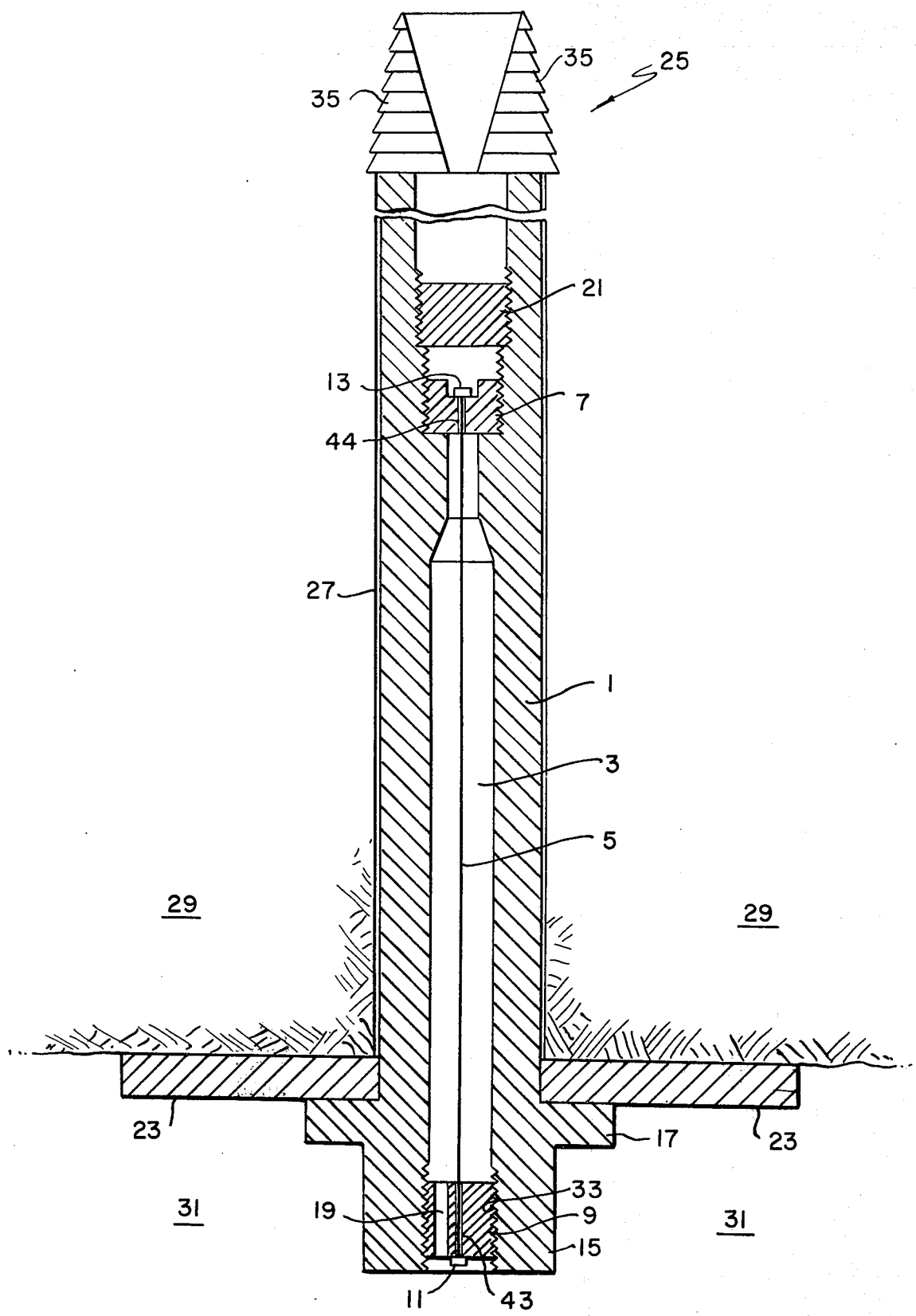
FIG. 1 is a cross-sectional view of our invention in situ in a mine roof attached to an anchor.

Although not part of our invention, FIG. 1 also illustrates a lower bearing surface plate 23, an upper expandable anchor 25, and a borehole 27 in the mine roof 29. This in situ showing visualizes the cooperation of our invention with a commonly used rockbolt anchor and a roof bearing plate 23 used to distribute the load on the rock. When adjustable, anchor 9 is turned in its threaded connection 33 so that the tension on the wire 5 can be increased or decreased. Plate 23 is normally firmly held against the mine's roof since the rotation of head 15 causes its threaded upper end 21 to rotate its connected anchor 25. As the upper anchor rotates its expansion shell members 35 expands outwardly to engage the upper borehole rock and lock the FIG. 1 arrangement in place.

Figure 2:
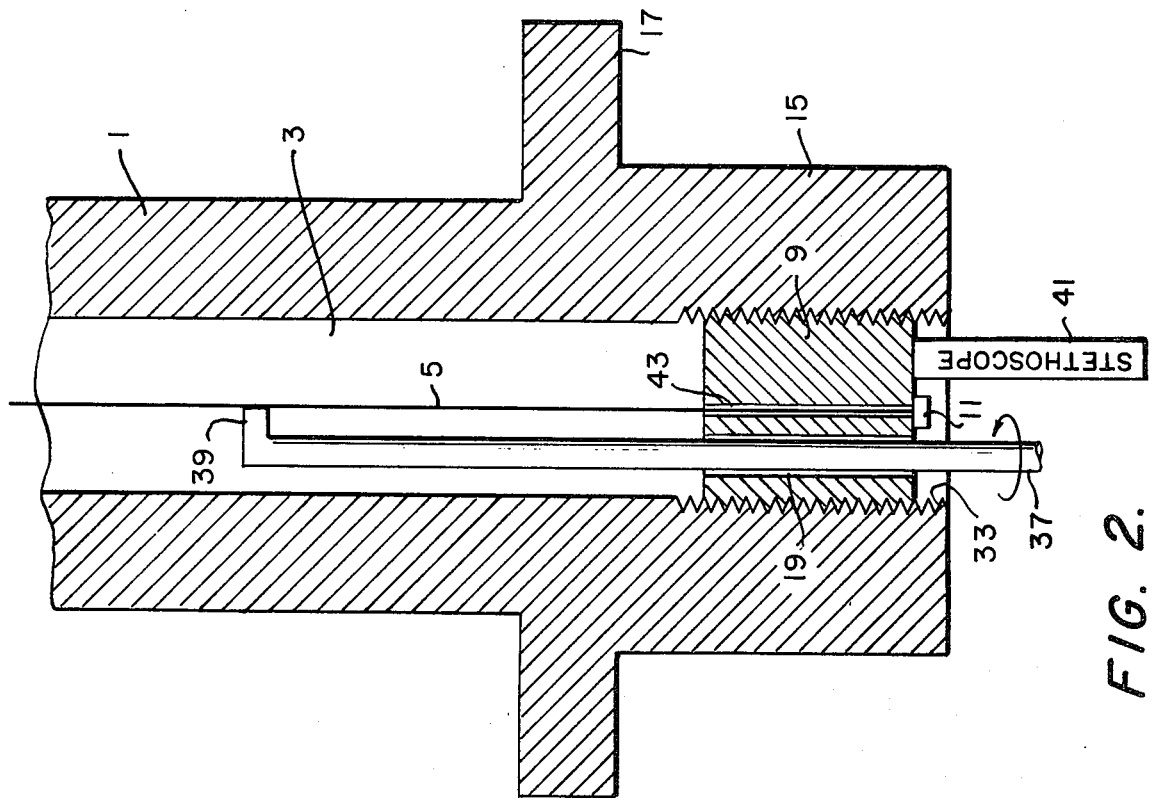
FIG. 2 shows an enlarged cross-sectional view of the front portion of the FIG. 1 gage with a pick and stethoscope in their operative positions.

In the enlarged front portion view of FIG. 2 an elongated pick rod 37 is shown inserted in access hole 19. This rod is generally L-shaped such that at right angles to its front end there is an arm 39 that can engage the wire 5 when the pick is rotated. The configuration in cross-section of hole 19 takes into consideration the arm 39 i.e., it could be oblong or elliptical rather than a circle. Also shown is a mechanics stethoscope 41 used to detect the vibrations of wire 5. Hole 43 in the lower anchor provides a pass through for the wire to where it ends at the retaining member. The upper anchor cylinder 7 is also provided with an aligned center through hole 44 to insure that the wire which passes through both holes is centered within the cavity 3. Not shown in the drawings is (hole 19 is one of them) one of the two recesses located in the outer face of lower anchor 9 which are used to engage a tool to rotate the anchor cylinder and thereby change the wire's tension.

Figure 3:
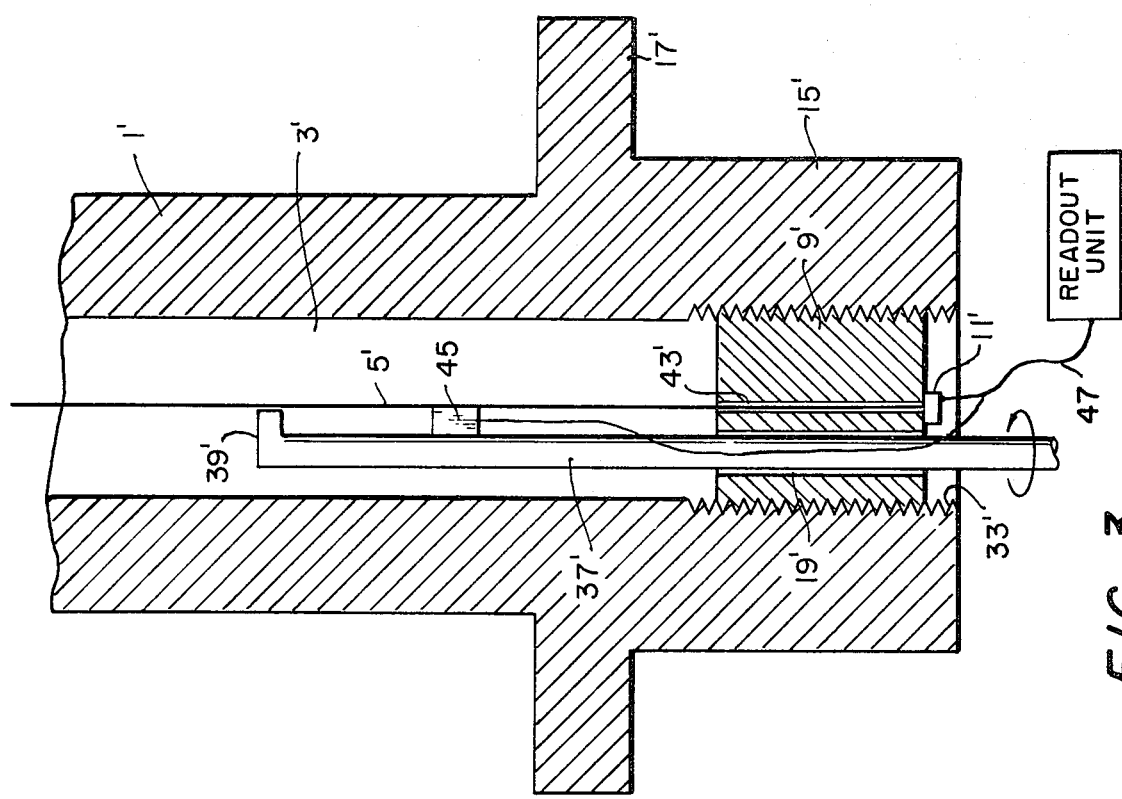
FIG. 3 is another embodiment of a readout unit usable with our invention.

FIG. 3 is the same invention shown in FIG. 2 except that a different type of readout unit is being used to detect the vibratory frequency of the wire. Primes have been used in FIG. 3 next to its numbers to indicate the same parts previously described with respect to FIG. 2. The pickup head 45 is attached to the rod 37' and is used to pickup the vibrations of wires 5'. A cable 47 connects the head to a battery operated portable readout unit. Head 45 has a small vibration sensitive transducer (like a small "pea" microphone or a piezo electric pickup) whose detected vibrations are fed to the readout unit. This unit amplifies the signals from the head and then sends the amplified signals to a frequency meter. One type of frequency meter that could be used is a panel mounted reed meter such as Model 41-Fx-42 made by J.B.T. Instruments of New Haven, Conn. except that no damping resistor is used for the range of interest. Such a 42 reed meter could be operated by a 30 d.c. volt, 30 milliampere power supply with a 3 to 4 second response time for the range of $\pm 1000 \times 10^{-6}$ inches per inch of wire strain. This type of unit automatically eliminates all extraneous mine and ground noise and responds only to the primary input signal.

In one working embodiment of our invention, the steel piano wire 5 was 10 inches long and 0.020 inches in diameter. The tensile yield strength of such a wire is typically in the order of several hundred thousand pounds per square inch. The body cylinder 1 of our preferred embodiment was about 1 foot long and 1 inch in outer diameter. For the total rockbolt shaft with our invention mounted in place at its lower end and its upper anchor, the total length can vary. Typically, 6 feet would be the total distance involved although total lengths between 2 to 20 feet are not unknown.

When the FIG. 2 setup is used for a fully mechanical procedure, the pick rod 37 is inserted in the off-center hole 19. The wire 5 is usually centered in the diameter of the body 1. The arm 39 engages the wire when the rod is rotated. Depending upon the tension initially placed on the wire by rotating anchor 9, the frequency of vibration of the wire will vary. Changes in the pre-established initial tension (or frequency) are detected by a skilled operated with stethoscope 41 who compares what he hears with the known frequency of vibration of a standard tuning fork. Reportedly, variations of only a few hertz per second can be detected by skilled operators.

The theory of operation of vibrating wire strain gauges is well known. What is done is to initially tension a wire and a device (in our case a rockbolt) to the same tension and note the frequency of the wire's vibration. When the rocks around the rockbolt move the tension on the rockbolt can decrease or increase. The wire will reflect this decrease or increase in its tension and the frequency of its vibration. Increases in the wire's tension caused by bearing plate 23 (FIG. 1) moving down will result in the wire elongating slightly and its natural vibratory frequency increasing due to increased tensions. Conversely, if the initial tension in the wire is decreased by the tension on the plate and head decreasing, the wire's natural mode of vibrating frequency will decrease.

Mathematically, this operation can be expressed by looking at a wire with an initial length L and an initial tightened tension T. In such a case, the frequency of the fundamental mode of vibration $n$ is:

$$n = \frac{1}{2L} \sqrt{\frac{T}{m}} \quad (1)$$

where $m$ is the mass per unit length. When stress is placed on the bolt 15, the strain $\epsilon$, that the fixed wire feels is increased by an additional tension $\Delta T$, which is given by $(2) \Delta T = AE\epsilon$ where $A$ is the wire's cross-sectional area, and $E$ the elastic modulus of the wire. When the new changed natural frequency $n$ is measured, it can be shown to be:

$$n = \frac{1}{2L} \sqrt{\frac{T + AE\epsilon}{m}} \quad (3)$$

Equation (3) has assumed that the change in mass per unit length is sufficiently small to be neglected. Suppose, for example, that our invention was mounted on a ⅝ inch diameter rockbolt so that its stiffness equals that of the rockbolt and the wire tuned to a 500 hertz frequency as its initial tension setting. Tests for our wire show that if the strain (change in wires length/initial length) is allowed to vary between ± 1,000, the load change needed will be ± 9,210 pounds and the frequency change will be from 592 hertz (+1,000) to 387 hertz (−1,000).

The wire gage, or extensometer as it is sometimes referred to, can be installed on the bottom of the anchored rockbolt in two ways. The first method would be to place the untuned (slack) wire and the gage body on the rockbolt. Then the wire would be tightened or tuned by rotating anchor seat 19 in its threaded convertion 33. The second method would be to pretune the wire and then tighten the bolt to some predetermined frequency (load). This second method would not only provide negative or positive load response, as would the first method, but would do away with the need for torque measurements on the bolt.

Either mechanical or electromagnetically activated devices may be used for oscillating the taut wire and picking up changes from its initial frequency setting at a later time. However, since it would preferably be used in the gaseous environment of a mine, the danger of an explosion taking place is reduced substantially if only the mechanical plucking and readout method described with respect to FIG. 2 is used. Although this safe readout and plucking method is preferred to minimize the dangers from a mine explosion, a great variety of more accurate electronic readout methods similar to the FIG. 3 embodiments could be employed. Our invention, therefore, should not be restricted to the particular method used to readout the vibrations but only by the scope and extent of the claims that follow.

We claim:

1. A vibrating wire gage for use with a mine rockbolt comprising:
   an elongated cylindrical body having an internal cavity with an upper and lower end;
   a taut vibratory wire anchored near its two ends and adapted to fit within said cavity and extend between the two cavity ends; means at the upper end of said body for attaching a rockbolt shaft thereto;
   cavity access means located near the cavity's lower end for allowing the insertion of a plucking device into the cavity to provide for the mechanical plucking of said wire; and
   adjustable anchoring means at the lower end of the cavity acting to adjustably retain the wire's lower end.

2. The gage of claim 1 wherein said means for adjustably anchoring said wire at its lower end comprises an externally threaded cylinder to engage threads in the lower end of the body, said anchor cylinder having a central aperture, and a wire retaining device located near the end of said central aperture.

3. The gage of claim 1 wherein the upper end of said vibrating wire is anchored by an externally threaded cylinder whose threads engage threads in the body's cavity.

4. The gage of claim 1 wherein said cavity access means is a hole which extends through said adjustable anchoring means from outside the gage into the cavity.

5. The gage of claim 1 also including an elongated pick rod adapted to be inserted within cavity access means to extend to said cavity whereby said vibratory wire can be engaged and plucked thereby.

6. The gage of claim 1 wherein said vibratory wire is tensioned by over 100,000 p.s.i. of tension.

7. The gage of claim 1 wherein said lower adjustable anchor means has an elongated through hole aligned with a hole in an upper anchor, said wire extending through both of said holes and being retained therein by opposite end retaining members located on the far sides of said holes.

8. The gage of claim 1 also including an elongated plucking rod with a microphone attached thereto to pluck said wire and detect the vibrations thereof.

* * * * *